United States Patent [19]

Galloway

[11] 4,399,200

[45] Aug. 16, 1983

[54] DEVICE FOR CONTROLLING A PUMP IN A STORAGE BATTERY

[75] Inventor: James H. Galloway, New Baltimore, Mich.

[73] Assignee: Energy Development Associates, Inc., Madison Heights, Mich.

[21] Appl. No.: 318,468

[22] Filed: Nov. 5, 1981

[51] Int. Cl.³ ............................................. H01M 8/04
[52] U.S. Cl. ........................................ 429/23; 429/49; 429/63; 429/70; 429/81
[58] Field of Search ................... 429/23, 49, 67, 70, 429/72, 81, 63, 64, 61

[56] References Cited

U.S. PATENT DOCUMENTS

| | | | |
|---|---|---|---|
| 3,850,695 | 11/1974 | Keller et al. | 429/23 |
| 3,935,024 | 1/1976 | Symons | 136/6 E |
| 3,996,064 | 12/1976 | Thaller | 429/63 X |
| 4,098,959 | 7/1978 | Fanciullo | 429/23 X |
| 4,287,267 | 9/1981 | Whittlesey | 429/61 X |
| 4,304,823 | 12/1981 | Lemelson | 429/61 X |

Primary Examiner—Charles F. Lefevour

Attorney, Agent, or Firm—Body, Vickers & Daniels

[57] ABSTRACT

In a system for controlling the flow rates in a storage battery of the type having at least one pump driven at a controlled speed by a motor driven at a speed determined by the average applied voltage and the load experienced by the pump, which system includes a circuit for applying an average voltage to the motor and means for generating a reference signal for controlling the general magnitude of the average applied voltage to drive the pump at the desired speed, there is provided an improvement. This improvement comprises means for supplying a main voltage level of a given magnitude, means for alternately switching the main voltage level across the pump driving motor wherein the switching means has a first condition with the voltage level applied across the motor and a second condition with the voltage level isolated from the motor, and signal generating means normally responsive to a voltage control signal controlled at least in part by the reference signal for creating a signal to change the relative time the switching means is in the first condition compared to the time the switching means is in the second condition.

28 Claims, 17 Drawing Figures

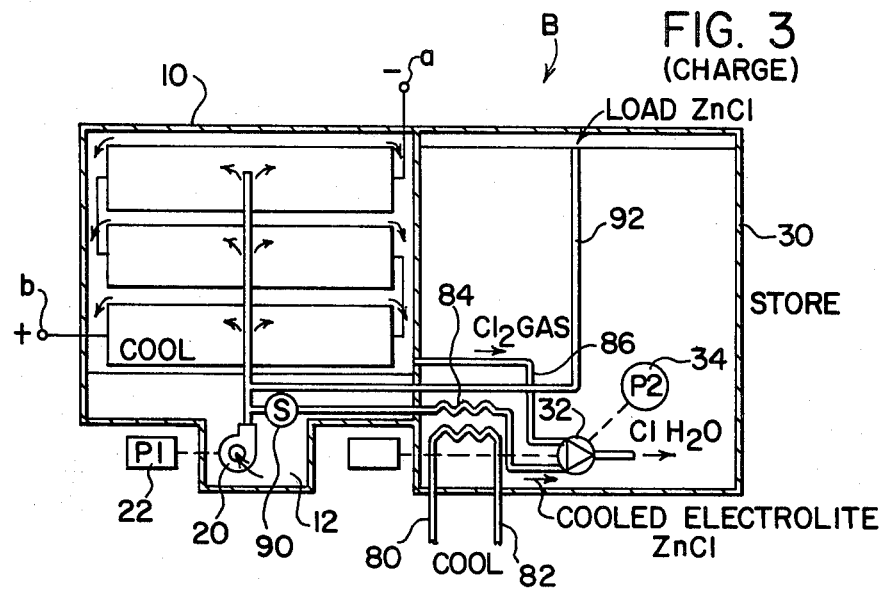
FIG. 3 (CHARGE)
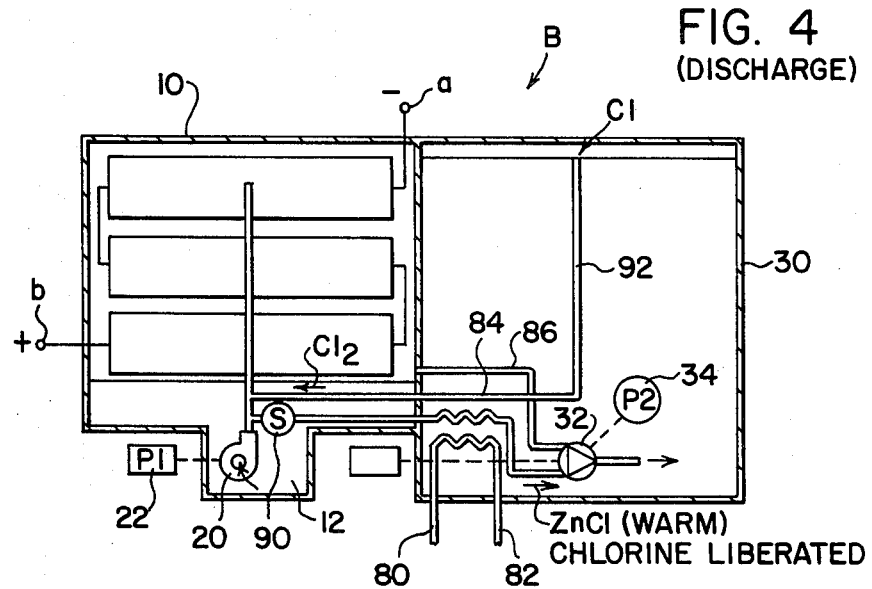
FIG. 4 (DISCHARGE)

$V_{PI}$ = DUTY CYCE X B+ (NORMAL)
PI+ ≐ B+ ∴ $V_F-$ ~ DUTY CYCLE
MODULATE DUTY CYCLE BY $V_F-$

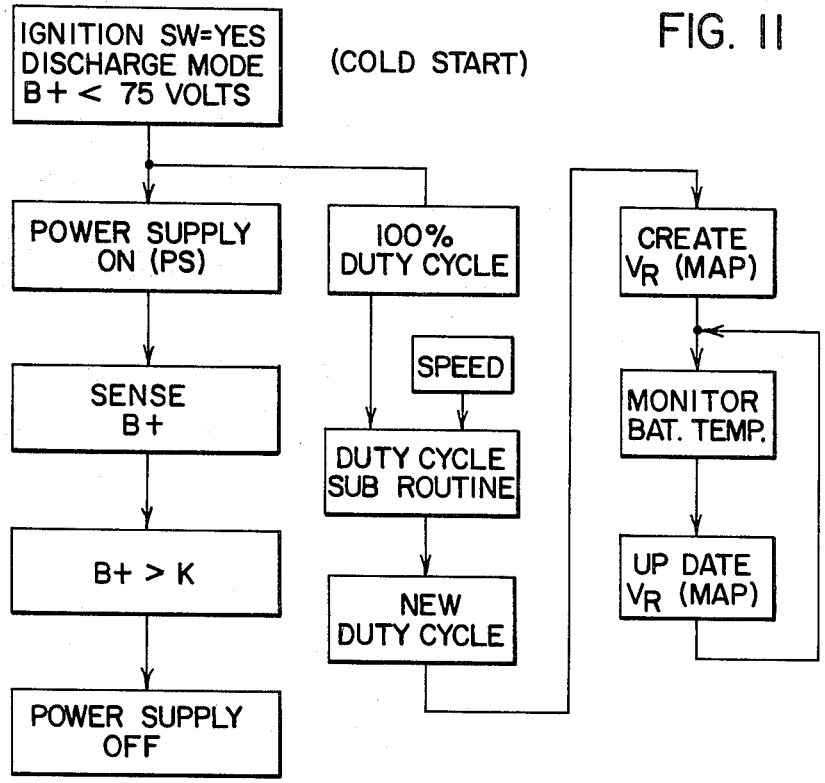
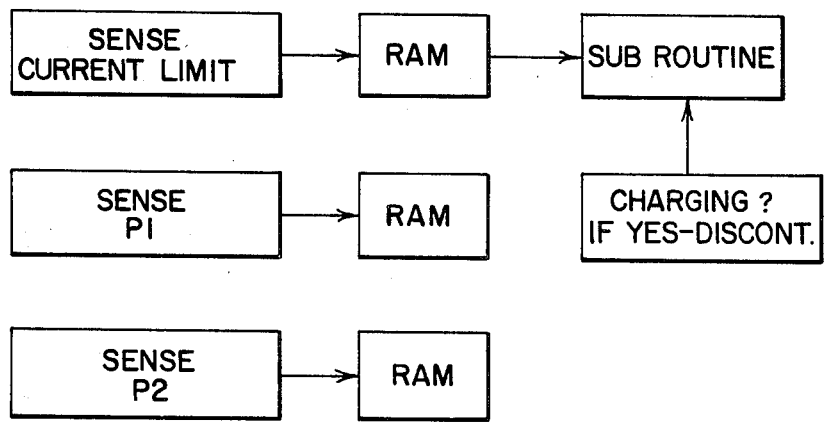
FIG. 11

DEVICE FOR CONTROLLING A PUMP IN A STORAGE BATTERY

The present invention relates to the art of controlling electric storage batteries and, more particularly, to an improved pump control device for use in an electric storage battery control system.

INCORPORATION BY REFERENCE

The invention is particularly applicable for controlling the pump or pumps employed in a halogen hydrate type of electric storage battery of the general type disclosed in U.S. Pat. No. 3,935,024. This patent is incorporated for reference herein as an example of the type of storage battery employing the pump or pumps and to which the present invention is directed.

BACKGROUND OF THE INVENTION

In recent years there has been a tremendous worldwide effort to develop motor vehicles operated by a fuel other than a petroleum distillate. Such efforts have resulted in hydrogen powered vehicles, steam powered vehicles and electric powered vehicles, the latter of which have been adopted as the most promising alternative to the normal gasoline consuming internal combustion engine. With the adoption of the electric motor vehicle as the proposed answer to such a crucial problem, there has been a need to develop an on-board source of electrical power. Since fuel cells, nuclear generators and other systems have not been perfected to a degree which allows their immediate use on motor vehicles, most developmental efforts in commercializing electric powered motor vehicles now involve the use of storage batteries carried by the vehicle. For that reason, various types of storage batteries have been developed with the objective of increasing the range between charging, without sacrificing the operating speed and/or decreasing the time and effort required in actually charging the on-board storage battery. This objective has now been generally satisfied by zinc-chloride battery of the type commercialized by Energy Development Associates and generally disclosed in U.S. Pat. No. 3,935,024. This patent is incorporated by reference herein as background information regarding the power supply or main storage battery to which the present invention is particularly applicable. When employing a zinc-chloride battery, a plurality of cells are combined to create a source of direct current voltage having a voltage level sufficient to drive efficiently the motor used in propelling the vehicle. In practice, the zinc-chloride batter has a normal operating voltage of 120 volts D.C. This voltage is applied to the storage battery during a charging operation and it is created by the battery during normal discharge or driving of the vehicle. Consequently, the basic on-board power supply of a motor vehicle of this type has an available main voltage level, which in practice is 120 volts D.C. This allows efficient operation of a drive motor. Zinc-chloride and other metal halogen storage batteries require at least one motor driven pump. This pump circulates electrolyte through the cells during both charging and discharging of the battery. Generally, this type of battery incorporates a second pump usually a gas pump which is used to exhaust halogen, in practice chlorine, from the main battery compartment to a storage compartment wherein the chlorine is formed into a chlorine-hydrate. This action occurs during charging. In addition, this second pump may be used during discharging to facilitate the flow of chlorine from the hydrate storage area to the main battery compartment. Since these two pumps are to be used both in a discharging mode and a charging mode, they are driven by D.C. motors which normally respond to a voltage level corresponding to the available voltage on the vehicle. Generally this level is the high voltage level of the main storage battery, in practice 120 volts D.C. By providing one or more D.C. motor driven pumps in a battery system for use on a vehicle, it is necessary to provide a control system for these pumps so that they are operated in accordance with the desired parameters existing at any given time in the battery system. Thus, the pumps must have variable speed which is accurately controlled to optimize the chemical and physical parameters employed in the complex circulatory and chemical systems embodied in a zinc-chloride type of battery. Controlling the pumps is somewhat complex procedure if the pumps are to be a factor in optimizing the operation of the battery. Such optimization is required to obtain uniform operation and long life of a battery for powering a motor vehicle. Control of these pumps is further complicated by the exigencies of the variable conditions under which the main battery must operate. When the pumps are stopped, the cells do not produce maximum voltage; however, the operation of a pump, particularly at this time, is crucial to battery start-up. During such start-up, it is essential that the battery be operated in accordance with the preselected plan to bring the battery into its starting mode. This must be done rapidly since public acceptance of the vehicle demands that the vehicle be ready to move with a minimum delay after the operator starts the vehicle. Thus, the pumps must be operable at a controlled speed at variable voltage levels of the main battery and during periods of time when the main battery has no output voltage, i.e. when the only available on-board electricity comes from an auxiliary storage battery of the 12 volts type. In addition, since one critical factor of commercial acceptance in a vehicle is the mileage between charges, the pumps must not be a major consumer of available stored energy. This requires accurate monitoring of adverse conditions when the pump or pumps draw substantial current. Thus, it is necessary that the pumps not be allowed to draw substantial currents for prolonged times without some type of external attention.

THE INVENTION

The present invention relates to improved arrangements for controlling pumps of the type used in a storage battery on a motor vehicle and it will be described with particular reference thereto; however, it is appreciated that the invention has broader applications and may be used in other environments. In accordance with the invention, there is provided a system for controlling the D.C. pumps associated with the main battery used in driving a motor vehicle, which system provides accurate control of the pumps over variable voltage conditions and also prevents the pumps from drawing substantial current for prolonged periods without operator attention.

In accordance with the present invention, there is provided an improvement in a system for controlling the flow rates in a storage battery of the type having at least one pump driven at a controlled speed by a motor driven at a speed determined by the average applied voltage and the load experienced by the pump. This type of system includes a circuit for applying an average voltage to the motor and means for generating a reference signal for controlling the general magnitude of the average applied voltage to drive the pump at the desired speed. The improvement in this type of a system is the provision of means for supplying a main voltage level of a given magnitude, means for alternately switching the main voltage level across the motor wherein the switching means has a first condition with a voltage level applied across the motor and a second condition with the voltage level isolated from the motor and signal generating means normally responsive to a voltage control signal controlled at least in part by the reference signal for creating a signal to change the relative time the switching means is in the first condition compared to the time the switching means is in the second condition. In this manner, the pump is driven in accordance with the reference signal at a desired speed. In accordance with another aspect of the invention, the reference signal is modified in accordance with the feedback signal from the voltage applied to the pump to further control the operation of the pump. In accordance with another aspect of the present invention, the current used by the D.C. motor driving the pump is sensed and current controlled signal is created. This signal is used to control the pump when the current control signal exceeds a preselected value. In this manner, the motor driving the pump can be shifted from normal operation when the motor voltage is monitored to control speed to another operation wherein the current used by the motor is used to control motor speed. This last condition is sensed by the operator or an onboard microprocessing system to assure that the pump motors and the battery are given attention to prevent long term limiting operation.

In accordance with a still further aspect of the present invention, there is provided in a system as defined above an improvement wherein there is included means for sensing the current flow in the pump driving motor and for creating a current controlled signal in accordance with this flow and means for controlling the signal generating means operating the motor by the current control signal when the current control signal exceeds a preselected value. Thus, the current limiting mode of the pumps is detected and the pump is operated in accordance with the current employed by the D.C. motor driving the pump instead of the voltage employed by the motor.

In accordance with a still further aspect of the present invention, there is provided a system as defined above, which system includes a power supply for creating the main supply of voltage used for driving the pump motors. In accordance with this aspect, the system includes means for providing an electrical system with a fixed D.C. voltage level by an auxiliary battery separate from the main storage battery, means for providing a second D.C. voltage level by the main storage battery itself and variable between a lower voltage level and a higher generally fixed operating voltage level and means for creating the main voltage level for the pump motors by the first voltage level until the second voltage level exceeds a given value. In this manner, the pumps are driven by the auxiliary battery on the vehicle when the main zinc-chloride type of battery does not have sufficient voltage to drive the pump motors. Consequently, during start-up, the pump control system is operated by the auxiliary storage battery which can be standard lead-acid battery.

The primary object of the present invention is the provision of an improved system for controlling the operating pumps of a storage battery, which improvement allows accurate control of the pump operation during variations in the conditions experienced by the pump motor in the operation of the main battery.

Yet another object of the present invention is the provision of an improved system as defined above, which improved system normally controls the speed of the motors driving the pumps by alternately switching on and off a voltage level corresponding to the output level of the main battery at a controlled rate. This provides duty cycling of the D.C. motors driving the pumps so that it is not necessary to vary the magnitude of the voltage applied to the pump motors.

Still a further object of the present invention is the provision of an improved system as defined above, which system allows operation of the motors driving the pumps by a wide variation in the control level supplied to the pump so that the control system can operate during varying conditions existing in the storage battery.

Another object of the present invention is the provision of an improvement as defined above, which improvement allows the pumps to be driven selectively by the auxiliary storage battery on a vehicle, at least during cold start-up when the output voltage of the main battery is below a preselected level.

Still a further object of the present invention is the provision of a pump control system which can be operated at a current control system to match the exigencies existing in the operation of a storage battery requiring control of such parameters as pressure and temperature to optimize its operation.

Still a further object of the present invention is the provision of an improved system for controlling the pump motors of the type employed in a storage battery, which pump motors consume a minimum amount of electrical energy, thus do not substantially decrease the mileage between charging cycles of a main storage battery.

These and other objects and advantages will become apparent from the following description taken together with the accompanying drawings.

BRIEF DESCRIPTION OF THE DRAWINGS

In this disclosure, the following drawings are employed to disclose the preferred embodiment of the invention and its operating characteristics:

FIG. 3 is a schematic, cross-sectional view and flow chart showing a battery employing pumps of the type to which the present invention is directed and operating in the charging mode;

FIG. 4 is a cross-sectional view and flow chart, similar to FIG. 3, showing the battery being operated in the discharge or normal mode;

PREFERRED EMBODIMENT

Figure 1:
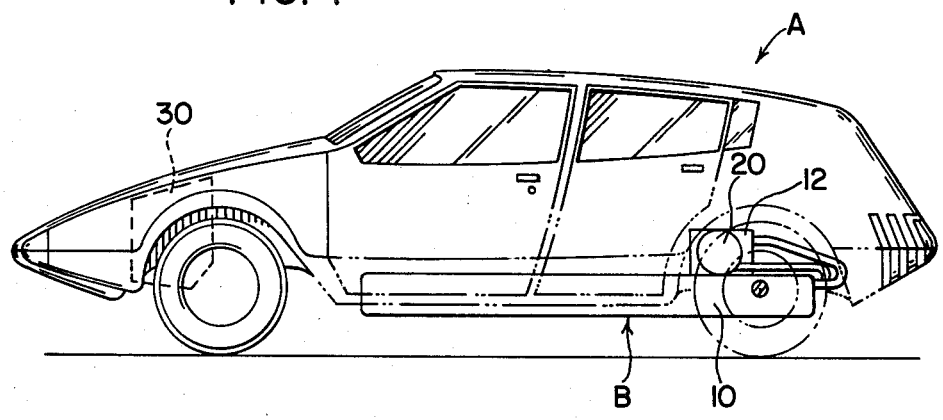
FIG. 1 is a side view of a motor vehicle employing a zinc-chloride type of battery to which the present invention is particularly directed.
Figure 2:
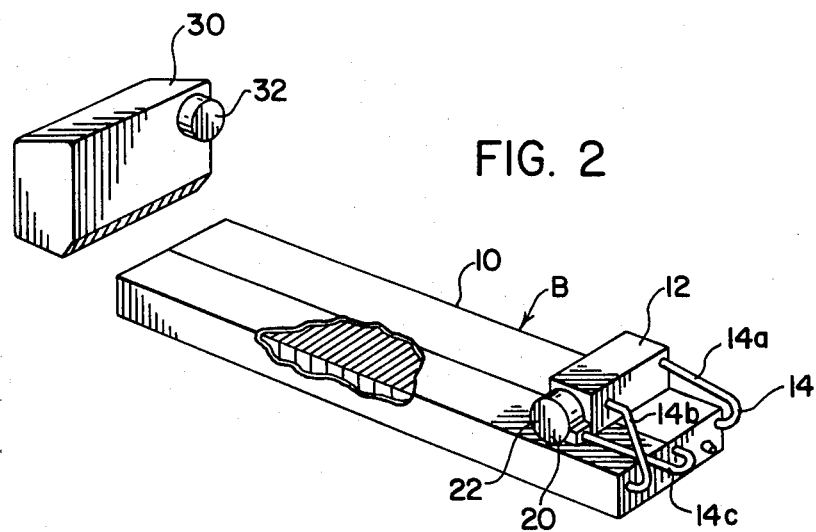
FIG. 2 is a schematic, pictorial view showing the battery as employed in the vehicle of FIG. 1 together with the arrangement of the pumps controlled in accordance with the present invention.

Referring now to the drawings wherein the showings are for the purpose of illustrating a preferred embodiment only and not for the purpose of limiting the same, FIGS. 1–4 show an electric powered motor vehicle A driven by storage battery B of the zinc-chloride type, generally shown in U.S. Pat. No. 3,935,024, incorporated by reference herein. This type of battery is manufactured by/or for Energy Development Associates and has a substantially greater driving range between charges than other batteries being suggested for use in electric powered motor vehicles. This zinc-chloride battery is now being considered as a power source for electric powered motor vehicles such as vehicle A. A zinc-chloride battery or similar battery includes a stack portion 10 containing the electric cells and a reservoir or sump 12 for storage of electrolyte. Piping 14, including return lines 14a, 14b and pressure line 14c, is employed for circulating electrolyte by circulation pump 20, driven by motor 22 and designated P1. Storage tank 30 for chlorine-hydrate is connected by an appropriate gas line, not shown, includes an internal pump 32 for moving gaseous material, i.e. chlorine, between stack 10 and tank 30 during charging and discharging of battery B. Pump 32 is driven by motor 34 designated P2. As so far described, battery B of vehicle A is a standard zinc-chloride battery having, in the preferred embodiment, two groups of thirty cells, each of which produces approximately 2.0 volts D.C. Thus, the output across battery leads a,b, in practice, is approximately 120 volts D.C. Of course, various voltages could be obtained by different numbers of battery cells in stack 10. This type of storage battery is charged in accordance with the arrangement schematically illustrated in FIG. 3, wherein a zinc-chloride battery is selectively connected to an external power source supply of 120 volts D.C. across terminals a,b. During the charging mode, pumps 20, 32 are driven by D.C. motors 22, 34, respectively. This circulates electrolyte through stack 10 and pumps chlorine, by gas pump 32, into the storage tank 30. Chlorine-hydrate is formed in tank 30 due to the chilling action of bypassed electrolyte, which is cooled by an external coolant circulated through lines 80, 82. Electrolyte is drawn into pump 32 through line 84 which is illustrated as being undulating to facilitate cooling of the chlorine passing through adjacent line 86 and into pump 32. Of course, lines 84 and 86 could be combined prior to reaching the inlet of pump 32. Solenoid 90 is actuated to bleed or bypass a small amount of electrolyte through line 84 for chlorine-hydrate formation at pump 32. This chlorine hydrate is stored in tank 30 for use during the discharge or normal operating mode of battery B, as shown in FIG. 4. The amount of electrolyte circulating through line 84 is controlled by a valve shown schematically as solenoid 90. During discharge, as shown in FIG. 4, pump 20 is driven by motor 22 to circulate electrolyte through stack or battery compartment 10. This creates a voltage across leads or lines a,b. Chlorine-hydrate in tank 30 is liberated and flows through line 92 into compartment 10 for the purpose of creating electric energy at leads a, b. FIGS. 3 and 4 are representative of a system using a zinc-chloride battery of the type to which the present invention is directed. These types of batteries employ two or more pumps, in the illustration, pumps 20, 32. Of course, various modifications could be made in the basic parameter for operation of the battery B. For instance, pump 32 is operated during discharge to heat the chlorine-hydrate in tank 30 for the purpose of liberating chlorine. This is done by bleeding warm electrolyte from compartment 10 through line 84. The pumps shown in FIGS. 3 and 4 could be driven by motors operated at various voltage levels; however, the present invention relates to an improved system which controls the average voltage supplied to motors, such as motors 22, 34, for the purpose of driving these motors in accordance with a desired preselected operating plan for the pumps. The schematic representation of the basic zinc-chloride battery can be found in prior U.S. Pat. No. 3,935,024 and is set forth for illustrative purposes only in FIGS. 3 and 4.

Figure 5:
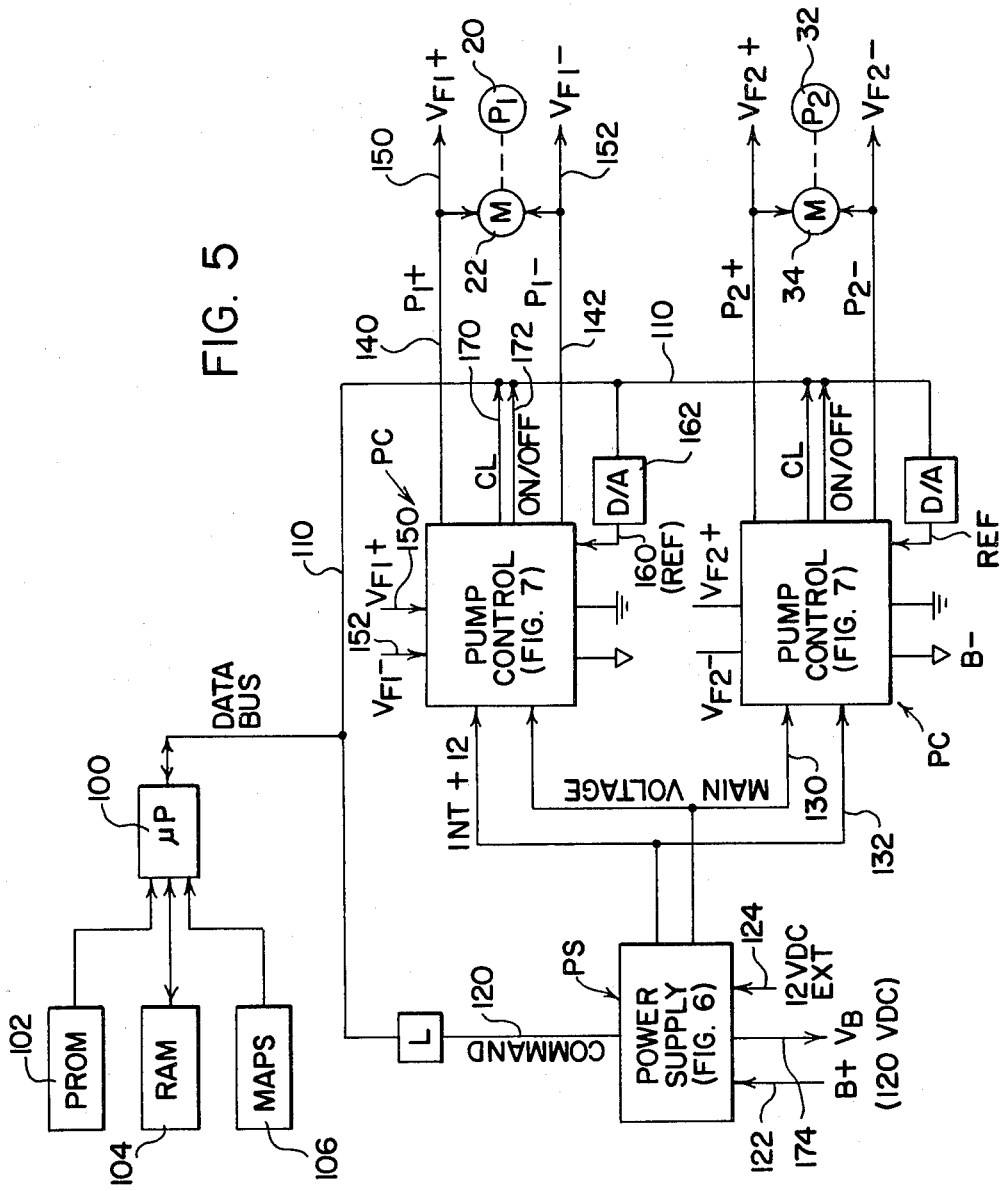
FIG. 5 is a block diagram showing the overall system for controlling two pumps by the preferred embodiment of the present invention.

Referring now more particularly to FIG. 5, a system employing the preferred embodiment of the present invention to control pumps of a storage battery is illustrated as a system for controlling pumps 20, 32 through motors 22, 34, respectively, as discussed with respect to the illustrative embodiment of FIGS. 1–4. In this system, an appropriate on-board microprocessor 100 receives an executive program from PROM 102 to control the complete operation of battery B. This type of system, of which many are available, also employs a RAM 104 for temporary storage of binary information used in processing the executive program of PROM 102. In accordance with standard digital practice, an appropriate MAP or MAPs 106 are used so that characteristics either on the real time basis for otherwise can be compared with information permanently stored in the MAPs to determine the operating characteristics of battery B at any given time. Time may be related to charge condition and not real time. For instance, the MAPs or other storage arrangement can store the desired speed of pumps 20, 32 at any given time or under any given circumstances, such as pressure, temperature, charged state. Thus, when a preselected speed is desired for one of the pumps, the information is sought from a storage area, represented as MAPs 106, and is outputted by microprocessor 100 on appropriate data bus 110. The executive program continues monitoring parameters in battery B and updates, periodically, the desired speed of the pumps at any given time. This type of control arrangement is general in nature and is shown in the preferred embodiment as the desired system for outputting information regarding the desired operation of pumps 20, 32 or any other pumps involved in the operation of battery B. The particular arrangement or control system for obtaining information regarding the desired speed of pumps 20, 32 does not form a part of the invention and is illustrated only for completeness of disclosure.

The pump control PC is constructed in accordance with the preferred embodiment of the present invention and is employed with each pump 20, 32 to be controlled. In the illustrated embodiment, two pumps 20, 32, are to be controlled; therefore, two pump control circuits or devices PC are employed. These controls are identical; therefore, only the pump control PC used to control the voltage applied to motor 22 will be described in detail. This description applies equally to the pump control used to apply voltage across motor 34. A single power supply PS is used to control the voltage levels applied to each of the pump controls PC. This power supply forms one aspect of the present invention and is shown in detail in FIGS. 6 and 10D. For the purpose of a general explanation, as shown in FIG. 5, power supply PS includes a command line 120 which receives binary logic from data bus 110, which logic may be latched in an appropriate latch L, such as a flip-flop. As long as a preselected logic is applied to line 120, power supply PS is operated to produce voltage to pump controls PC. The positive output voltage of battery B is applied to power supply PS at line 122. An external 12 volts D.C. is also applied to power supply PS through line 124 connected to the auxiliary lead-acid battery also mounted on vehicle A. The main voltage output of power supply PS is applied to line 130. This voltage output varies in accordance with the graph shown in FIG. 7A and is ultimately the voltage level of battery B. Power supply PS also creates an internal 12 volts voltage in line 132. Thus, the output of power supply PS is essentially an internal 12 volts supply (12 V INT), on line 132 and a main voltage on line 130. Both of these voltage levels are directed to the input of pump control PC. As is apparent from FIG. 10D, power supply PS monitors the voltage of battery B and produces a monitoring signal in lines 174. These lines are directed to data bus 110 for use by microprocessor 100. In practice, if the voltage of battery B exceeds approximately 74 volts D.C., latch L is reset and the command logic in line 120 is removed to transfer control of the input voltage to pump controls PC from the auxiliary or external voltage supply of line 124 through the main power bus of battery B attached to line 122.

Referring again to FIG. 5, voltage in lines 140, 142 is applied across motors 22 in accordance with the operation of pump control PC. The positive voltage level feedback in line 150 ($V_{F1}+$) is directed from line 140 back to pump control PC. In like manner, the applied voltage is monitored at line 152 which is a feedback ($V_{F1}-$) connected between negative power line 142 and pump control PC. Thus, the general voltage level applied to motor 22 is read by line 150 and the average applied voltage is read by line 152. These are the main control lines for operating D.C. motor 22 in accordance with a reference signal in line 160 which is applied through a digital to analog converter from data bus 110 to pump control PC. Thus, the reference signal in line 160 provides a current which is at a level to set the desired speed of pump motor 22. This information is provided to pump control PC by microprocessor 100 in accordance with standard control practice. Although many motors which are controlled by the average applied voltage could be used for motors 22, 34, in practice Model 1 No. MC19P motor by CEM of Dyon, Cedex, France is used. These motors have a rating of 1.0 KW at 3000 RPM with 83.0 average voltage and 14.4 amperes. At 1.6 KW a speed of 3000 RPM is obtained with 85.5 volts and 22.2 amperes. (See U.S. Pat. Nos. 3,090,880 and 3,144,574).

As will be explained later, pump control PC is provided with an arrangement for converting the control of motor 22 from a voltage control to a current limiting control. When this occurs, logic on the current limiting (CL) line 170 is directed from pump control PC to the data bus 110. In a like manner, information in line 172 indicates that pump control PC has energized motor 22 in accordance with a command received from data bus 110.

Figure 6:
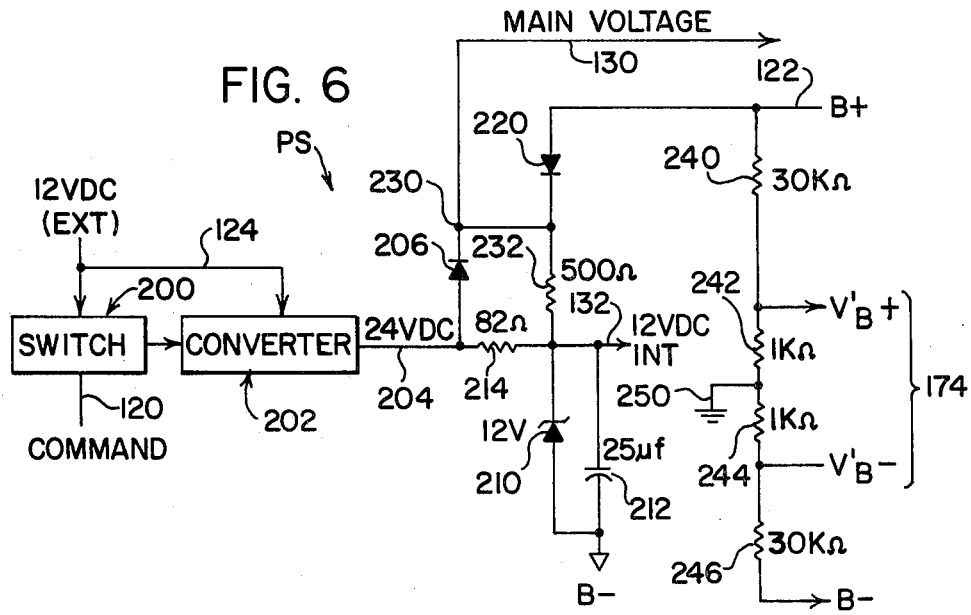
FIG. 6 is a combined block and wiring diagram showing a power supply constructed in accordance with one aspect of the present invention.
Figure 10A:
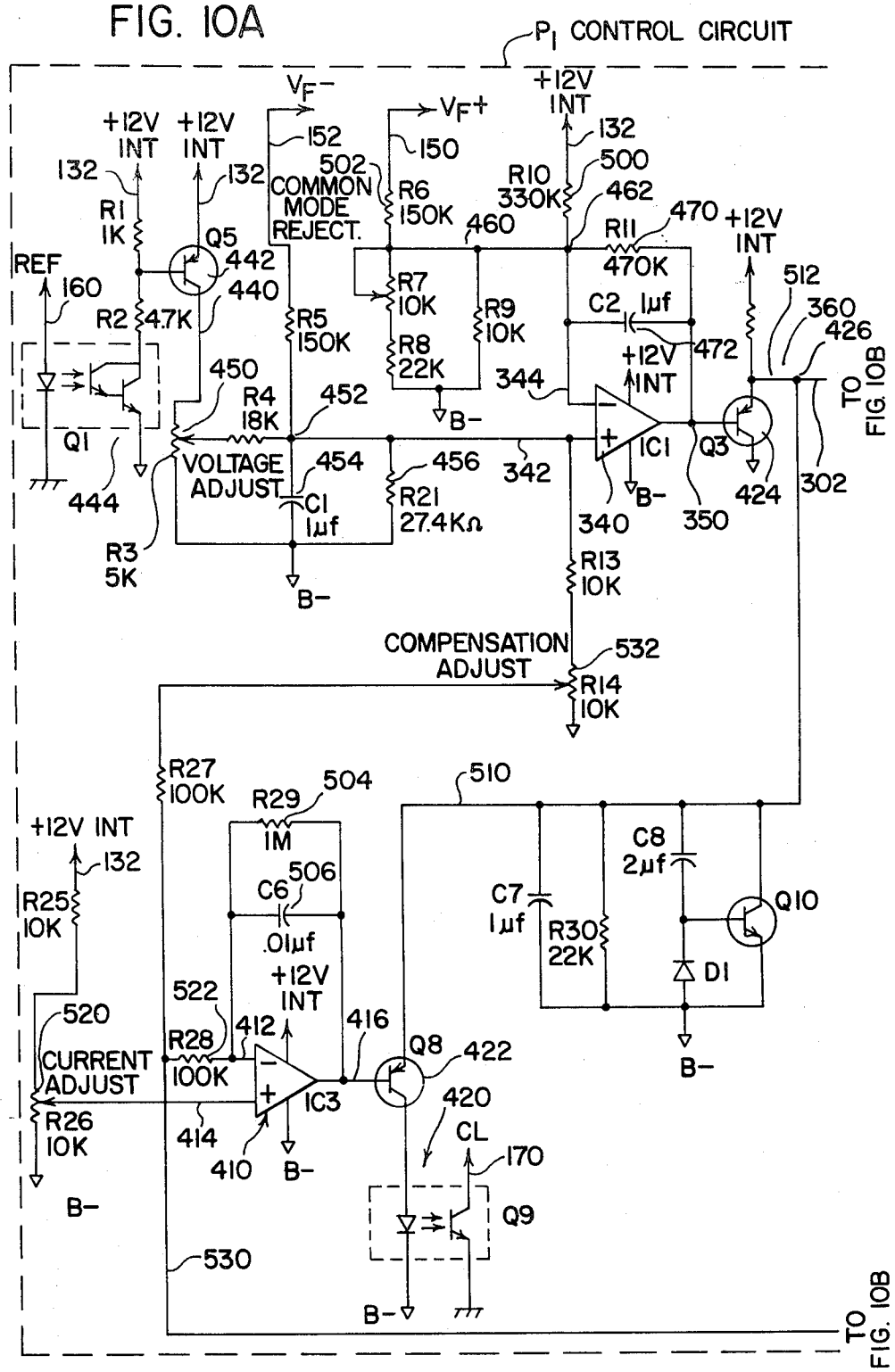
FIGS. 10A, 10B, 10C, 10D and 10E are to be taken together and are the wiring diagram now used to practice the present invention; and, FIG. 11 is a flow diagram showing certain operating characteristics of a system employing the present invention.

Referring now more particularly to FIG. 6, the power supply PS is set forth in detail. The actual circuit employed for power supply PS is shown in FIG. 10D; however, the inventive aspect of this circuit for providing a main voltage in line 130 is illustrated in FIG. 6. A switch 200 receives a binary command signal in line 120 as previously mentioned. This command signal is created when an operator closes a switch to start vehicle A. Also, the vehicle must be in a discharge mode and not connected to an external charging unit. Microprocessor 100 receives information from lines 174 that battery B has a certain voltage level. In practice if the voltage exceeds approximately 75 volts, there is no command given to switch 200. This voltage level will be realized when vehicle A has been recently driven. In that situation, the temperature of the battery would still be high and an immediate supply of voltage would be available at terminals a,b. Assuming that there is a start request with a cold battery, then a command signal is received by switch 200. This energizes converter 202 for converting 12 volts from the auxiliary battery in line 124 to 24 volts in line 204. Diode 206 connects line 204 with main voltage supply line 130. Thus, when switch 200 is actuated, 24 volts is directed to line 130. A Zener diode 210 is connected in parallel with a filter capacitor 212 and connected to line 204 by resistor 214. The internal 12 volts of D.C. power (12 volts INT) previously described is maintained at line 132. This power level is maintained by converter 202 until the voltage in line 122 reaches a level exceeding a level of 24 volts D.C. of output of diode 220. At this time, the voltage in line 122 is balanced by the voltage in line 204 at discriminating point 230 which is also in line 130. As the voltage in line 122 increases, the voltage at the anode of diode 220 exceeds the voltage at the anode of diode 206. When this occurs, the battery voltage in line 122 is applied to resistor 232 for holding the 12 volts condition of line 132 (12 volts INT). Thus, as shown in FIG. 7A, the voltage in line 130 is 24 volts until the B+ voltage exceeds this voltage level. At that time the voltage in line 130 follows the voltage of battery B as applied through line 122. To furnish intelligence to microprocessor 100 regarding the voltage across battery B, the power supply PS includes a voltage divider having resistors 240, 242, 244 and 246 with a center tapped ground 250. Thus, the voltage across resistor 242 is a positive voltage and the voltage across resistor 244 is a negative voltage. Any information detected by lines 174 is directed to data bus 110 for use in accordance with the executive program. As will be apparent later, the main voltage applied across motor 22 fluctuates in accordance with the graph in FIG. 7A, at least during cold starting of vehicle A. Pump control PC is constructed to produce feedback signals for detecting the voltage levels and controlled by the duty cycle of motor 22. The average voltage applied to the pump will be controlled by the duty cycle of the voltage across lines 140, 142 in accordance with the desired speed of the pump as directed to the reference line 160. The voltage across lines 140, 142 is rapidly applied and removed from motor 22. The time of application to the time of removal is the duty cycle.

Figure 7:
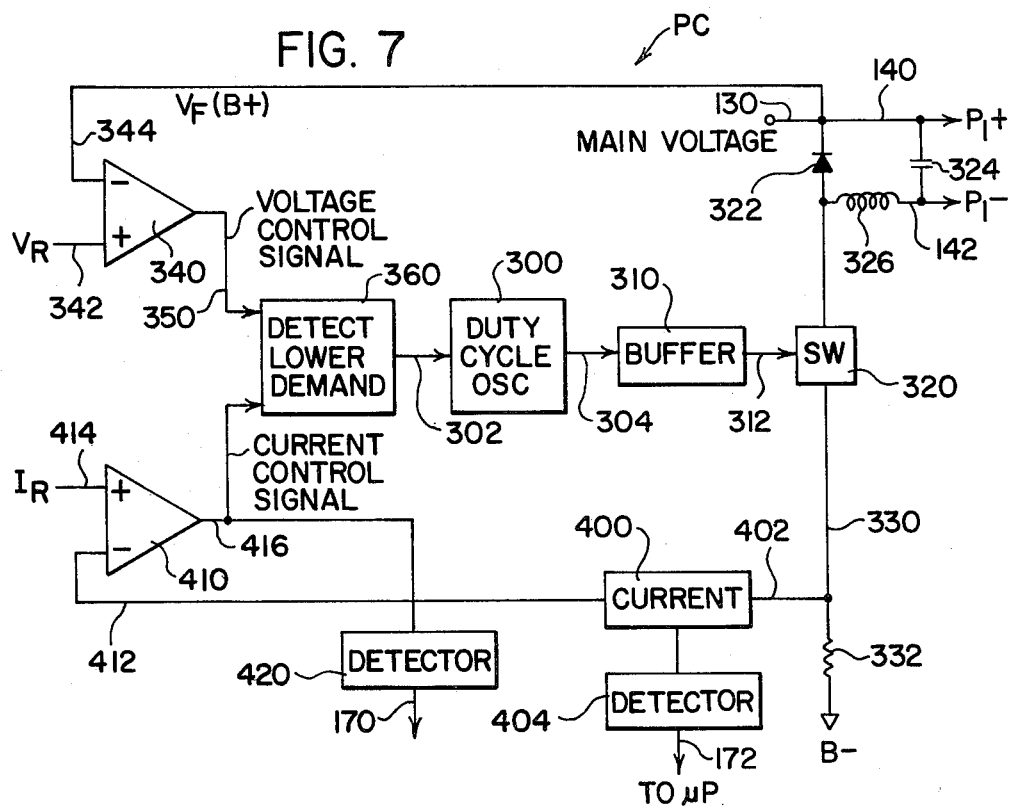
FIG. 7 is a block and wiring diagram showing a simplified view of a control system constructed in accordance with the present invention and shown generally in the system of FIG. 5.
Figure 7A:
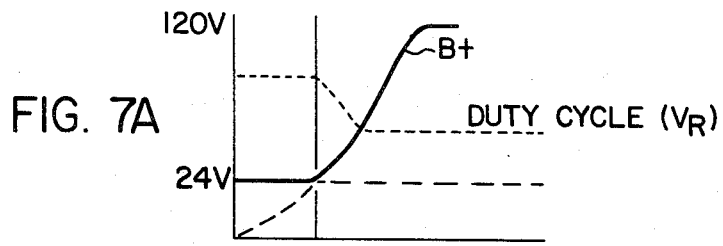
FIG. 7A is a chart showing an operating characteristic of a preferred embodiment of the present invention.
Figure 7B:
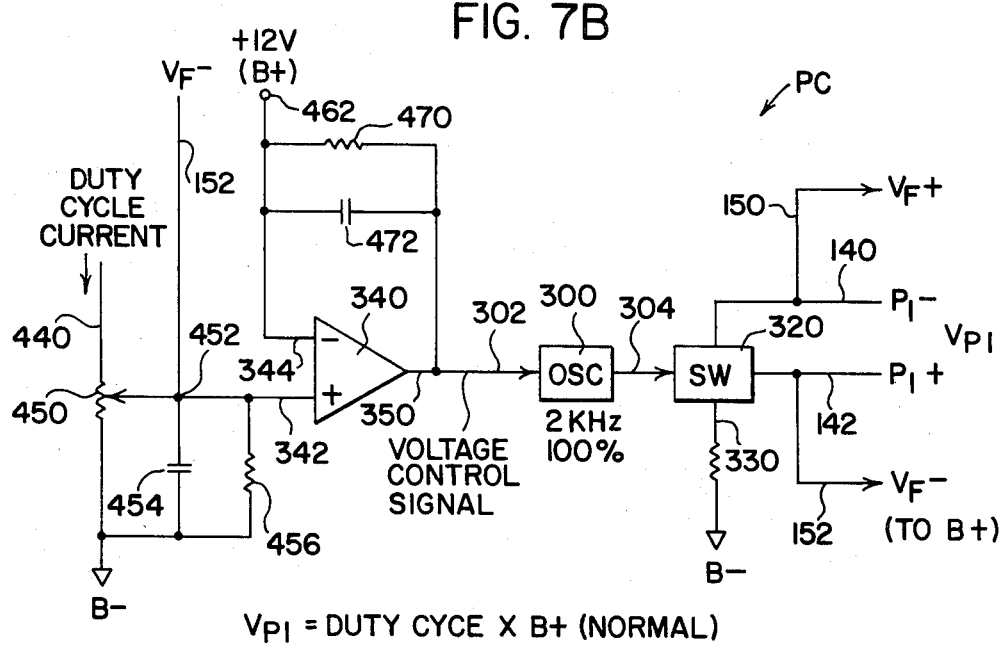
FIG. 7B is a wiring and block diagram similar to FIG. 7 showing certain details of one aspect of the present invention.
Figure 8:
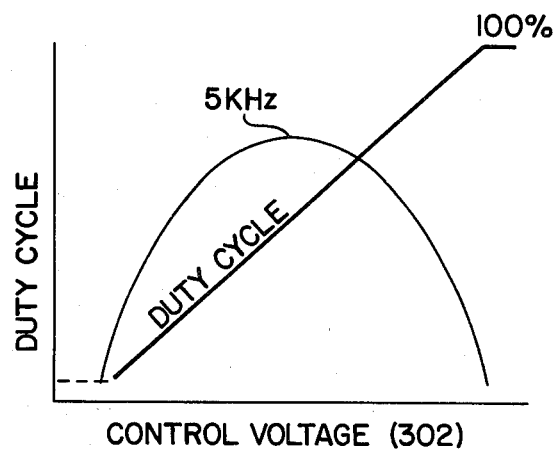
FIG. 8 is a graph illustrating the operating characteristic of the duty cycle oscillator employed in the preferred embodiment of the present invention.
Figure 9:
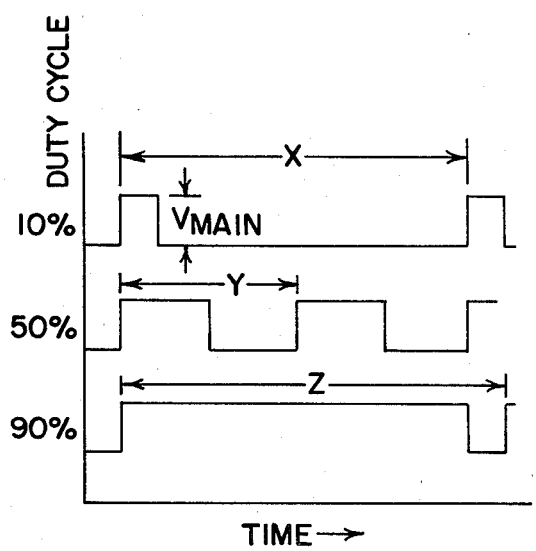
FIG. 9 is a chart showing output signals employed in the duty cycle oscillator of the preferred embodiment of the present invention.
Figure 10B:
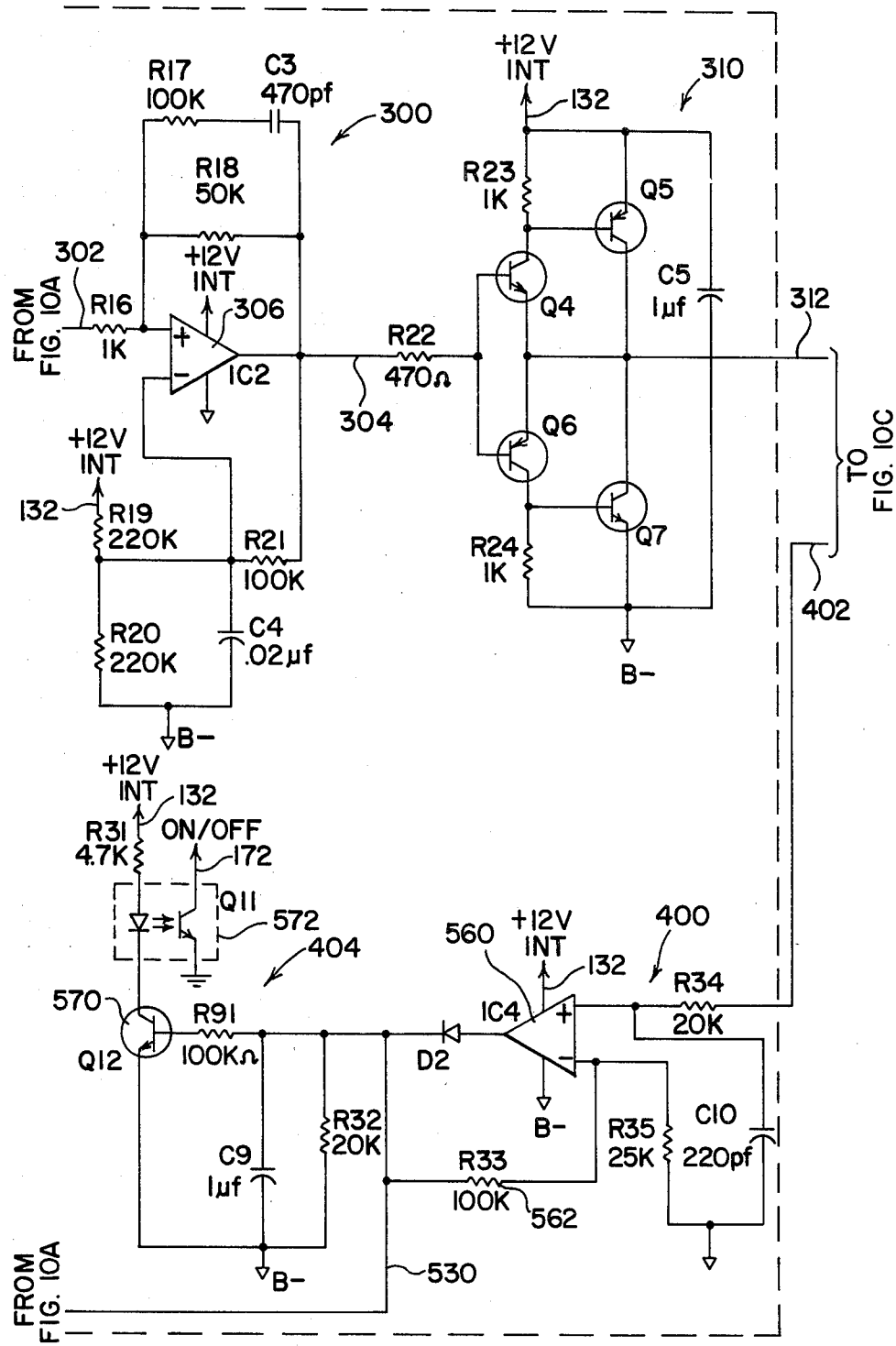

Referring now to FIGS. 7, 7A, 7B, 8, 9 and 10B, the main voltage in line 130 is alternately connected across and isolated from pump motor 22 by a signal generating means in the form of a duty cycle oscillator 300 having a voltage control signal input line 302 and an output line 304, which output line has a first state connecting the main voltage in lines 130 and 140 across motor 22 and a second state isolating this voltage from the motor. Thus, the relative time during which the signal in line 304 is in the first state compared to the time that the signal is in the second state controls the average voltage across motor 22. This ratio together with the magnitude of the main voltage in line 130 from power supply PS controls the average voltage across motor 22 and thus controls the speed of the motor in accordance with standard practice. As can be seen, the magnitude of the voltage is set by the level of voltage in line 130, and the alternation of line 304 from a first state to a second state controls the average voltage. Although a variety of voltage controlled oscillators could be employed for this purpose, FIG. 10B shows an oscillator wherein amplifier 306 is connected to provide oscillations as shown in FIGS. 8 and 9. As the voltage in line 302 increases, the frequency in line 304 increases to approximately 5.0 KHz and then decreases as shown in FIG. 8 as the duty cycle increases to hundred percent (100%). At 100% duty cycle, the frequency is approximately 2.0 KHz in line 304. Referring now to FIG. 9, at approximately 10% duty cycle, the main voltage is connected across motor 22 10% of the time. The pulses in line 304 are of a period indicated at x. At a 50% duty cycle, the output of line 304 is oscillating at approximately 5 KHz and the first condition of line 304 is in existence for approximately the same time as the second condition. This produces a period indicated as y. When 100% duty cycle is approached 90% is illustrated, the period again increases to a value similar to x. Consequently, voltage controlled oscillator 300 does not have a fixed period to control the duty cycle. In this manner, there is a reduced ripple effect during control of the motor 22 by alternately applying and removing the main voltage from the power supply PS at line 130. By using high frequency, the motor does not experience a pulsating input. Of course, other voltage controlled duty cycle oscillators could be employed for the purpose of adjusting the power in accordance with the voltage magnitude in line 302 so that the average voltage across motor 22 is a product of the voltage at line 130 and the duty cycle controlled by the logic on line 304.

The general scheme used in the preferred embodiment of the invention to control the operation of the duty cycle oscillator 300, is best shown in FIGS. 7 and 10B. This oscillator includes operational amplifier 306 biased by the normal 12.0 volt power supply at line 132. The output signal in line 304 of oscillator 300 is passed through a buffer 310 to shape the pulses in line 312, which pulses are produced in accordance with the chart shown in FIG. 9. These pulses are directed to a switch 320 which is alternately actuated by the signal in line 312. When switch 320 is in one condition, a voltage, determined by the voltage on line 130, is applied across pump motor 22. The opposite condition of switch 320 disconnects this voltage from across the motor. Thus, the duty cycle output in line 304 controls the average voltage applied across the pump driving motor. This controls the speed of the motor and, thus, the speed of the pump. A diode 322 is connected across lines 140, 142 parallel with a filter capacitor 324. Thus, when switch 320 removes voltage from the pump motor, current flows through diode 322. This current flow is controlled by the impedance of choke or inductor 326. Line 330 provides the ground for switch 320 through resistor 332. To control voltage in line 302, there is provided a voltage driven comparitor 340 in the form of an operational amplifier schematically illustrated in FIG. 7. This amplifier includes a non-inverted input 342 which is controlled by the reference voltage related to the desired speed of the pump as provided by the control system onto data bus 110, as shown in FIG. 5. The inverting input of comparitor 340 is connected to a biasing line 344, which is illustrated as being connected to a feedback ($V_F$) connected to line 130. This voltage generally relates to the voltage pattern shown in FIG. 7A. Voltage levels in lines 342 and 344 control the voltage in output line 350 of comparitor 340. This voltage is, under normal conditions, the voltage control signal of duty cycle ocillator 300.

In accordance with one aspect of the invention, the voltage in line 350 normally controls oscillator 300; however, a discriminating means 360 is interposed between line 350 and line 302 so that when a current limiting situation exists in motor 22, discriminating means 360 shifts the control of oscillator 300 from line 350 to a current limiting input line 416, which is controlled by a current sensing circuit 400, best shown in FIG. 10B. This sensing circuit includes an input 402 connected above resistor 332 to detect the general level of current flow in motor 22. A detector circuit 404, as best shown in FIG. 10B, is used to indicate when motor 22 is shifted to the ON condition, as indicated by the logic on line 72. To control the voltage on line 416, there is provided a comparitor 410, best shown in FIG. 10A, which has a current level line 412 connected to the inverting input of comparitor 410 and a current bias or reference line 414 connected to the non-inverting input. The relationship between the bias or reference and the actual current sensed by circuit 400 determines when the current being used by motor 22 exceeds a value determined by the bias level of line 414. When this occurs the voltage in input line 302 of oscillator 300 is controlled by the signal in line 416. Discriminating circuit 360 is a circuit to allow use of whichever of the voltages in lines 350, 416 is the lower. By utilizing this arrangement, normal operation of duty cycle oscillator 300 is controlled by a relationship between a preselected set voltage and the operating conditions from a voltage standpoint at motor 22. When current exceeds a preselected level, discriminating means or circuit 360 transfers operation of the oscillator to a current limiting operation wherein the duty cycle is controlled by the voltage in line 416. Higher current levels at motor 22 create lower voltages in line 416. This reduces the duty cycle and reduces the current in motor 22. Consequently, the duty cycle of the voltage applied across the motor is controlled by the magnitude of the sensed current. An appropriate detector 420 is employed for creating a signal in line 170 that is directed to the microprocessor when a current limiting condition exists. By using discriminating circuit 360, the lowest demand is always employed to control the voltage in line 302. If the demand by the current condition in motor 22 produces a higher voltage in line 416, line 350 controls the voltage in line 302. A lower demand signal in line 416 is caused by a high current in the motor. After a threshold value is exceeded, line 302 is controlled by the voltage in line 416. As best shown in FIG. 10A, line 416 controls transistor 422 and line 350 controls transistor 424. These two transistors are connected to a common summing point 426 and form the discriminating means 360 of FIG. 7. As voltage increases in line 350, the transistor 422 conducts and point 426 is pulled electrically negative. In a like manner, as voltage in line 416 increases by increasing current conditions, transistor 422 conducts. This pulls point 426 electrically negative. The higher conducting of the two transistors 422, 424 controls oscillator 300 by input line 302 in accordance with the scheme discussed in connection with FIGS. 8 and 9.

Referring now more particularly to FIG. 7B, operation of comparitor 340 during normal conditions is illustrated. Under these conditions, oscillator 300 is controlled by comparitor 340 which has a feedback line 152. The level of voltage in this feedback line is indicative of the actual average voltage being applied to pump motor 22. This structure is shown in more detail in the upper portion of FIG. 10A and includes means for controlling current in line 440 in accordance with the desired duty cycle or speed of motor 22. As shown in FIG. 10A, this current is controlled by the conductivity of transistor 442 which, in turn, is controlled by the current flow in line 160 as detected by optical coupler 444. Rheostat 450 is used to set the maximum voltage when duty cycle is to be 100%. As current in line 440 varies below a set level, voltage applied to summing point 452 by rheostat 450 will be indicative of the desired duty cycle or pump speed. Summing point 452 is connected to the input 342 of comparitor 340 and is connected to the negative bus of battery B through capacitor 454 and resistor 456 for the purpose of filtering and adjusting the relationship of current flow at point 452. Summing point 452 is also connected with feedback line 152 which is generally responsive to the actual average voltage being applied by oscillator 300 to motor 22. Thus, the relationship at summing point 452 compares the desired and actual operation of motor 22 in normal situations. The other input of comparitor 340 is line 344 connected either to the internal 12.0 volts line 132 or to the positive feedback line 150 which generally follows the profile illustrated in FIG. 7A. Thus, under normal circumstances, line 344 is controlled by the positive bus of battery B.

During start-up, the 12.0 volts internal supply at line 132 is employed. This arrangement is shown in FIGS. 10A wherein circuit 460 is controlled by the positive battery bus as detected by line 150. Resistor 470 controls the gain of comparitor 340 and capacitor 472 is a filter capacitor.

The voltage across the pump motor is the product of the duty cycle and the voltage of the positive bus which is applied at line 130. Since the positive bus is generally fixed at line 140, the voltage at line 142 varies according to the duty cycle. This is sensed by feedback line 152, which modifies the reference signal in line 342 as discussed with respect to FIG. 7. This normal operation can be discontinued when adverse conditions cause high current flow in motor 22.

The detailed wiring diagrams in FIGS. 10A, 10B, 10C, 10D and 10E are circuits used in practicing the invention in so far described. The components employed are labeled and numbers used in the previous description are contained on the elements as found in these drawings. The wiring diagram is self-explanatory; however, certain aspects of the actual circuitry used will be discussed as it applies to the preferred embodiment of the present invention, shown in FIGS. 5-9.

In FIG. 10A, the upper portion relates to the comparitor 340 and its supporting components. Optical coupling 444 controls the conductivity of transistor 442 to control the voltage at point 452 as selected by microprocessor 100. The feedback signal in line 152 reads the actual average voltage being applied by oscillator 300 to motor 22. Point 452 controls noninverting input 342. Inverting input at line 344 is controlled either by the feedback in line 150 or the voltage in line 132. These voltages are summed at point 460 and weighted by the values of current flow through resistors 500, 502. Comparitor 340 controls detecting transistor 424, as previously described.

In the lower portion of FIG. 10A, current comparitor 410 and its control components are illustrated. This comparitor has a gain control resistor 504 and a filter capacitor 506. Output line 416 controls detecting transistor 422 to control the voltage on line 510 which controls optical coupler or detector 420. When line 510 is at a lower voltage than line 512, controlled by transistor 424, the current limiting mode is in effect. By adjusting pot 520, the resistance in line 414 is varied. This creates a bias current which is compared with the current flow allowed by resistor 522 for controlling the level of current in line 530 from circuit 400, as shown in FIG. 10B. To adjust the relative relationship between the upper voltage controlling circuit and the lower controlling circuit in FIG. 10A, there is an interconnecting compensation adjustment pot 532. So far explained, the input voltage at line 302 is controlled by the circuitry illustrated in FIG. 10A in accordance with the current sensed signal in line 530.

Figure 10C:
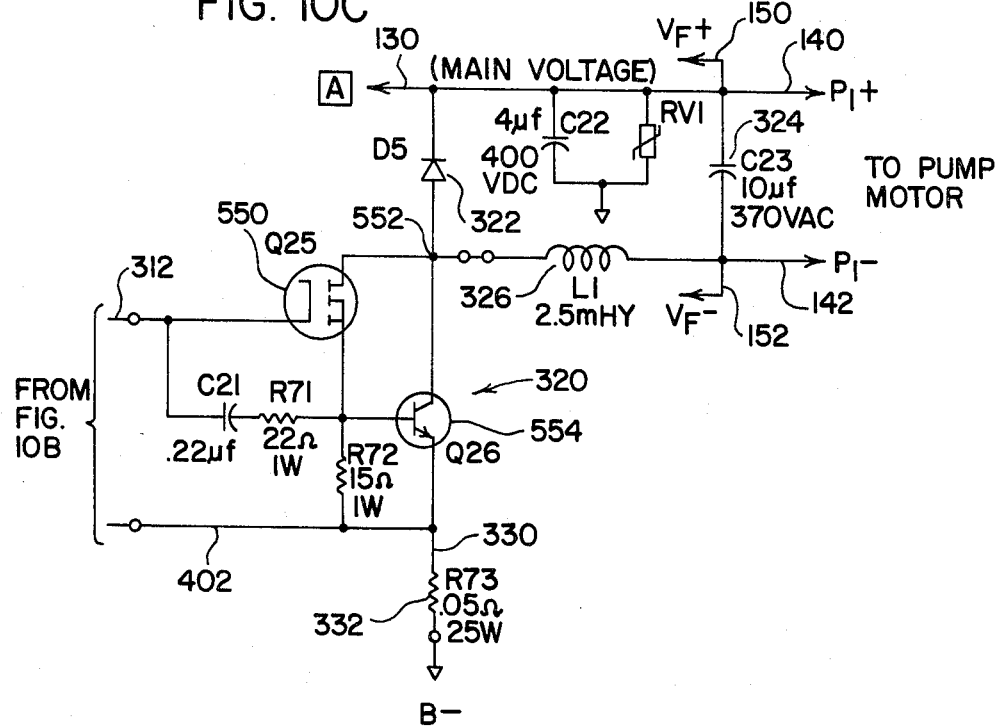
Figure 10D:
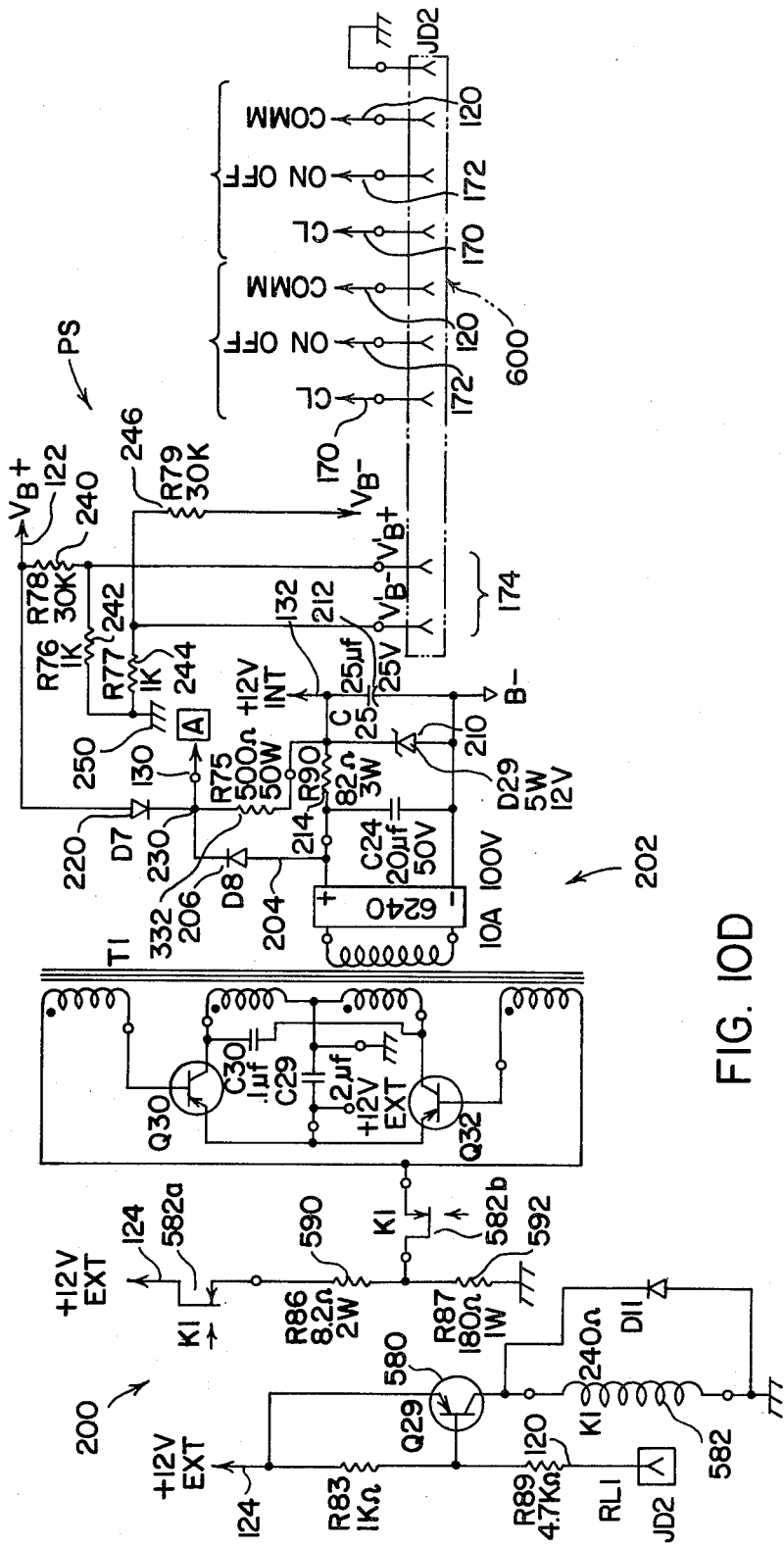

Referring now to FIG. 10B, oscillator 300 is controlled by operational amplifier 306 and has the parameters indicated to produce the desired oscillation in line 304, which have been discussed with respect to FIGS. 8 and 9. Buffer 310 is a somewhat standard pulse forming circuit to produce binary conditions in line 312 which are to control the average voltage applied across motor 22. The lower portion of FIG. 10B illustrates the circuit for the current sensing concept which will be described later. Referring now to FIG. 10C, the switch 320 includes an enhancement mode MOSFET switch 550 to switch point 552 in accordance with the voltage in line 312. When switch 550 is off, the voltage flows through choke 326. This is sensed by transistor 554 and is available as a voltage across resistor 332. This voltage is sensed by line 402 and is directed back to the circuitry shown in FIG. 10B as one input to operational amplifier 560. The gain of this amplifier is controlled by resistor 562 so that the amplifier produces a signal in line 530 which is proportional to the actual motor current. When the voltage in line 530 increases, transistor 570 is switched ON to cause current flow through optical coupler 572. This indicates that motor 22 is operating. This logic is sensed by data bus 110 so that such information can be stored in RAM 104. The voltage in line 530 is directed to comparitor 410, as shown in FIG. 10A.

Referring now to FIG. 10D, power supply PS is shown in more detail. During cold operation, a command is received in line 120. This causes conduction of transistor 580. Current flow in relay coil 582 closes switches 582a, 582b. This supplies the external voltage in line 124 from an auxiliary battery to a voltage divider including resistors 590, 592. This D.C. voltage is applied to a standard DC-to-DC converter 202 for the purpose of producing a 24.0 volts D.C. voltage in line 204. In FIG. 10D, there is also illustrated, somewhat schematically, a terminal strip 600 which is used in the preferred embodiment to produce output communication with the data bus 110.

Figure 10E:
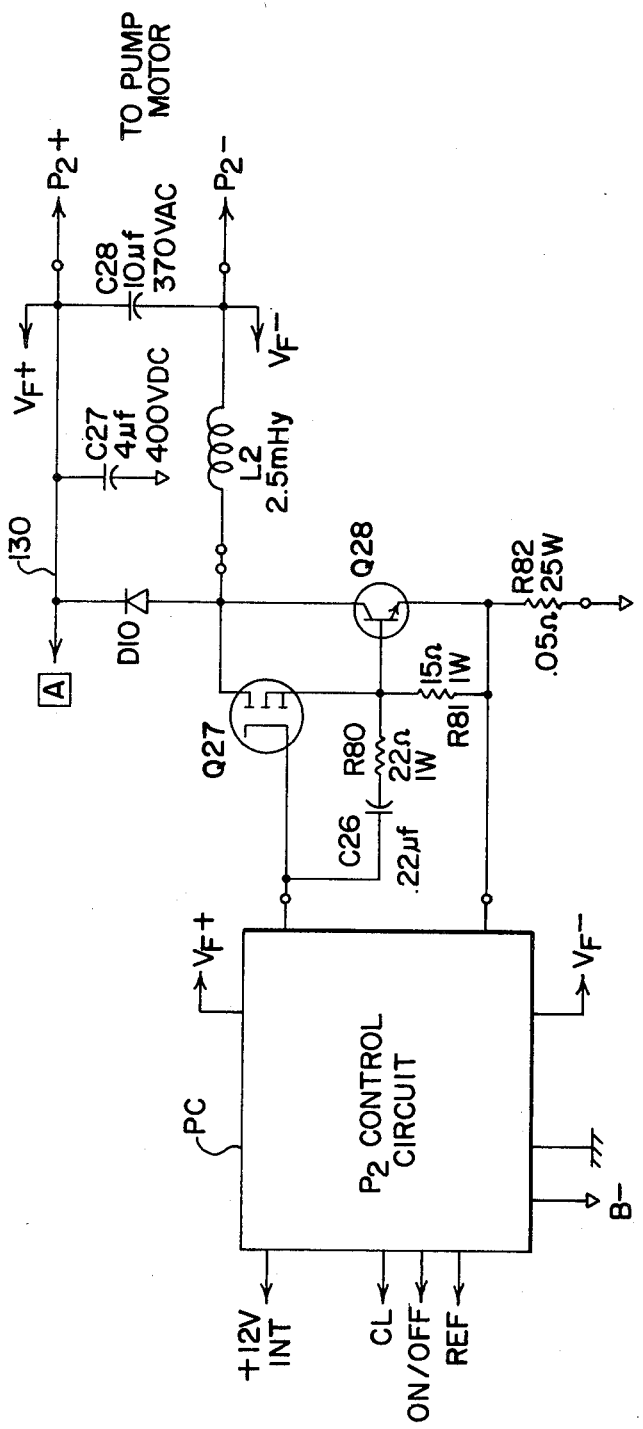

Referring now to FIG. 10E, the pump control for the second motor is schematically illustrated. As can be seen, it duplicates the pump control for motor 22. Each pump used in the storage battery is controlled by a separate control circuit PC. The standard power supply PS can be used for driving each of the several pump controls.

Referring now to the flow chart in FIG. 11, after an ignition switch or other indication has been made that the vehicle is to be started, microprocessor 100 determines whether or not battery B is in the discharge mode. If so, microprocessor 100 determines whether or not the positive bus of battery B is less than about 75.0 volts. If so, power supply PS receives a command in line 120. Microprocessor 100 then monitors the data on lines 174 to read the voltage across the battery. When this voltage exceeds a certain value, illustrated as K volts, a signal is created to remove the binary logic in line 120. This turns off power supply PS. During the initial operation, when power supply PS is energized, the duty cycle is set to 100% by controlling the flow of current through line 160. Thereafter, a duty cycle subroutine is processed by the microprocessor to monitor pump speed and other parameters, such as battery temperature and battery pressure, to produce a new duty cycle which relates to the desired speed of the pump. This speed changes from time to time according to sensed parameters, indicated in FIG. 11 as speed. These parameters are controlled by fixed patterns stored in MAPs 106 in accordance with standard control practice. This information is used to create a reference voltage for comparator 340 through current supplied to line 160. During monitoring, the reference is updated as indicated by the flow chart in FIG. 11. This is controlled by the sub-routine for the duty cycle. This type of control logic can be modified to produce different desired conditions for the pump in accordance with changing parameters or time during the use of battery B for driving the vehicle A. The lower portion of FIG. 11 relates to the concept that when the pump control is in the current limit mode this fact is directed to the microprocessor and stored in the RAM. When this happens, a sub-routine is processed to indicate difficulty, if the battery is not being charged. Indeed, after producing an alarm or light indication, the sub-routine could take other corrective actions. The fact that each of the pumps is energized and operated is also stored in RAM.

As can be seen, pump control PC receives a desired operating information and performs its function to control motors 22, 34 based upon this information. Under normal situations, the pump control is by voltage sensing and modulation. In adverse conditions, current limiting is available so that the current used by each of the pumps can be limited to prevent substantive reduction in the driving time due to adverse pump loading conditions or other parameters.

Having described the invention, the following is claimed:

1. In a system for controlling flow rates in a storage battery of the type having at least one pump driven at a controlled speed by a motor driven at a speed determined by the average applied voltage and the load experienced by the pump, said system including a circuit for applying an average voltage to said motor and means for generating a reference signal for controlling the general magnitude of said average applied voltage to drive said pump at a desired speed, the improvement comprising: means for supplying a main voltage level of a given magnitude; means for alternately switching said main voltage level across said motor; said switching means having a first condition with said voltage level applied across said motor and a second condition with said voltage level generally isolated from said motor; and, signal generator means normally responsive to a voltage control signal controlled at least in part by said reference signal for creating a signal to change the relative time said switching means is in said first condition compared to the time said switching means is in said second condition.

2. The improvement as defined in the system of claim 1 including means for sensing the general magnitude of the average voltage applied across said motor; means for creating a feedback signal based upon said sensed general magnitude; means for electrically combining said feedback signal with said reference signal for creating said voltage control signal.

3. The improvement as defined in the system of claim 2 wherein said electrical combining means is a means for algebraically summing said feedback signal and said reference signal.

4. The improvement as defined in the system of claim 3 including means for sensing the speed of said motor and means for changing said reference signal when said motor speed exceeds a preselected value.

5. The improvement as defined in the system of claim 2 including means for sensing the speed of said motor and means for changing said reference signal when said motor speed exceeds a preselected value.

6. The improvement as defined in the system of claim 1 including means for sensing the speed of said motor and means for changing said reference signal when said motor speed exceeds a preselected value.

7. The improvement as defined in the system of claim 2 including means for creating an output voltage feedback signal in accordance with said voltage level and means for comparing said combined signal and said output voltage feedback signal to produce said voltage control signal.

8. The improvement as defined in the system of claim 3 including means for creating an output voltage feedback signal in accordance with said voltage level and means for comparing said combined signal and said output voltage feedback signal to produce said voltage control signal.

9. The improvement as defined in the system of claim 1 including means for creating an output voltage feedback signal in accordance with said voltage level and means for comparing said reference signal with said output voltage feedback signal to produce said voltage control signal.

10. The improvement as defined in the system of claim 9 including means for sensing current flow in said motor, means creating a current controlled signal which varies in accordance with said sensed current and means for controlling said signal generating means by said current controlled signal when said current controlled signal exceeds a preselected value.

11. The improvement as defined in the system of claim 10 including discriminating means for creating an output signal to control said signal generating means, said discrimination including means for creating said output signal by said current controlled signal when said current controlled signal exceeds said preselected value and for otherwise creating said output signal by said voltage controlled signal.

12. The improvement as defined in the system of claim 11 including means for creating a flag signal when said current controlled signal exceeds a given value.

13. The improvement as defined in the system of claim 12 wherein said given value is generally equal to said preselected value.

14. The improvement as defined in the system of claim 11 including means for creating a flag signal when said current controlled signal exceeds a given value.

15. The improvement as defined in the system of claim 14 wherein said given value is generally equal to said preselected value.

16. The improvement as defined in the system of claim 1 including means for sensing current flow in said motor, means creating a current controlled signal which varies in accordance with said sensed current and means for controlling said signal generating means by said current controlled signal when said current controlled signal exceeds a preselected value.

17. The improvement as defined in the system of claim 16 including discriminating means for creating an output signal to control said signal generating means, said discrimination including means for creating said output signal by said current controlled signal when said current controlled signal exceeds said preselected value and for otherwise creating said output signal by said voltage controlled signal.

18. The improvement as defined in the system of claim 17 including means for creating a flag signal when said current controlled signal exceeds a given value.

19. The improvement as defined in the system of claim 16 including means for creating a flag signal when said current controlled signal exceeds a given value.

20. The improvement as defined in the system of claim 1 wherein said main voltage level supply means includes means for providing a fixed first D.C. voltage level controlled by an auxiliary source separate from said storage battery, means for providing a second D.C. voltage level controlled by said storage battery and variable between a lower level and a higher generally fixed level, and comparing means for using said first voltage level to control said main voltage level when said second voltage level exceeds a preselected level.

21. The improvement as defined in the system of claim 20 wherein said preselected level is generally said first level.

22. The improvement as defined in the system of claim 21 including means for disconnecting said first level from said comparing means after said second level exceeds a given level.

23. The improvement as defined in the system of claim 20 including means for disconnecting said first level from said comparing means after said second level exceeds a given level.

24. The improvement as defined in the system of claim 16 wherein said main voltage level supply means includes means for providing a fixed first D.C. voltage level controlled by an auxiliary source separate from said storage battery, means for providing a second D.C. voltage level controlled by said storage battery and variable between a lower level and a higher generally fixed level, and comparing means for using said first voltage level to control said main voltage level when said second voltage level exceeds a preselected level.

25. The improvement as defined in the system of claim 24 wherein said preselected level is generally said first level.

26. The improvement as defined in the system of claim 24 including means for disconnecting said first level from said comparing means after said second level exceeds a given level.

27. In a system for controlling flow rates in a storage battery of the type having at least one pump driven at a controlled speed by a motor driven at a speed determined by the average applied voltage and the load experienced by the pump, said system including:
 (a) a circuit for applying an average voltage to said motor;
 (b) means for generating a signal for controlling the general magnitude of said average applied voltage to drive said pump at a desired speed;
 the improvement comprising:
 (c) means for sensing the current flow in said motor; and creating a current controlled signal representative of said motor current flow; and,
 (d) means for controlling said signal generating means and thence said general magnitude of said average applied voltage by said current controlled signal when said current controlled signal exceeds a preselected value.

28. In a system for controlling flow rates in a storage battery of the type having at least one pump driven at a controlled speed by a motor driven at a speed determined by the average applied voltage and the load experienced by the pump, said system including a circuit for applying an average voltage to said motor and means for generating a signal for controlling the general magnitude of said average applied voltage to drive said pump at a desired speed, the improvement comprising: means for creating a main supply voltage level for said motor, said supply means including means for providing a first fixed D.C. voltage level by an auxiliary source separate from said storage battery, means for providing a second D.C. voltage level by said storage battery and variable between a lower level and a higher generally fixed level and means for creating said main voltage level by said first voltage level until said second voltage level exceeds a given level.

* * * * *